United States Patent [19]
Tieleman et al.

[11] Patent Number: 4,486,920
[45] Date of Patent: Dec. 11, 1984

[54] METHOD AND APPARATUS TO CUT OUT THE VENT OF A BIRD

[75] Inventors: Rudolf J. Tieleman, Doesburg; Jacobus E. Hazenbroek, Numansdorp, both of Netherlands

[73] Assignee: Tieleman B.V., Doesburg, Netherlands

[21] Appl. No.: 529,930

[22] Filed: Sep. 7, 1983

Related U.S. Application Data

[63] Continuation of Ser. No. 160,623, Jun. 18, 1980, abandoned.

[30] Foreign Application Priority Data

Jun. 19, 1979 [NL] Netherlands ......................... 7904778
Feb. 28, 1980 [NL] Netherlands ......................... 8001202

[51] Int. Cl.³ ............................................. A22C 21/06
[52] U.S. Cl. ............................................. 17/52; 17/11
[58] Field of Search ....................................... 17/11, 52

[56] References Cited

U.S. PATENT DOCUMENTS

| | | | |
|---|---|---|---|
| 3,886,635 | 6/1975 | Meyn | 17/11 |
| 3,921,255 | 11/1975 | LaBarber | 17/11 |
| 3,958,302 | 5/1976 | Meyn | 17/11 |
| 3,958,303 | 5/1976 | Scheier et al. | 17/11 |
| 4,023,237 | 5/1977 | Meyn | 17/11 |
| 4,035,867 | 7/1977 | Meyn | 17/11 |
| 4,059,868 | 11/1977 | Meyn | 17/11 |
| 4,071,924 | 2/1978 | Meyn | 17/11 |
| 4,074,390 | 2/1978 | Meyn | 17/11 |
| 4,087,886 | 5/1978 | Aubert | 17/52 |
| 4,131,973 | 1/1979 | Verbakel | 17/52 |
| 4,136,421 | 1/1979 | Scheier et al. | 17/52 |
| 4,155,146 | 5/1979 | Meyn | 17/11 |

Primary Examiner—Willie G. Abercrombie
Attorney, Agent, or Firm—Beveridge, DeGrandi and Kline

[57] ABSTRACT

An apparatus for cutting out the vent of a bird being made ready for consumption substantially comprises a number of rotatingly driven hollow cylindrical knives which each are secured to a slide. Each slide is provided with a roller which engages a curved cam surface of the apparatus. A corresponding number of positioning means are also provided with a roller which engages another curved cam surface. The problems relating to different dimensions of the birds and their legs are overcome by a structure which enables the rollers to depart from the paths determined by the curved cam surfaces.

20 Claims, 6 Drawing Figures

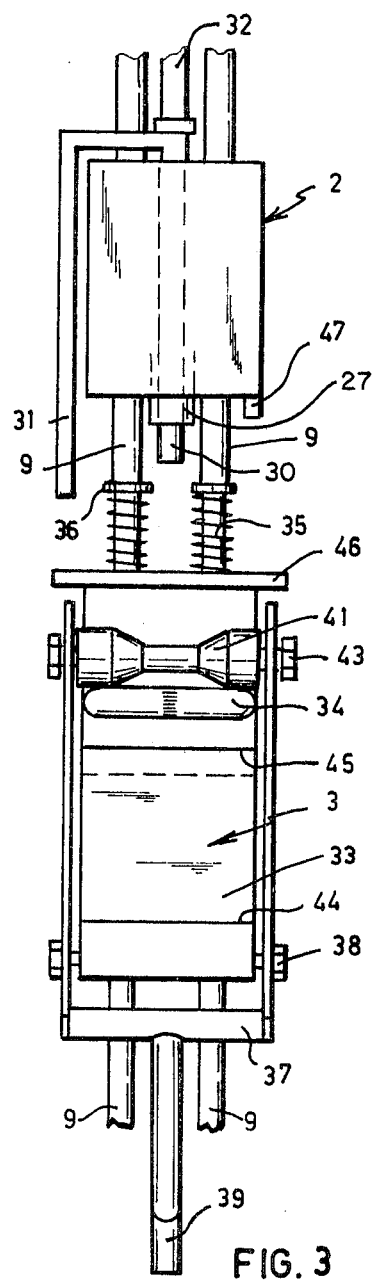
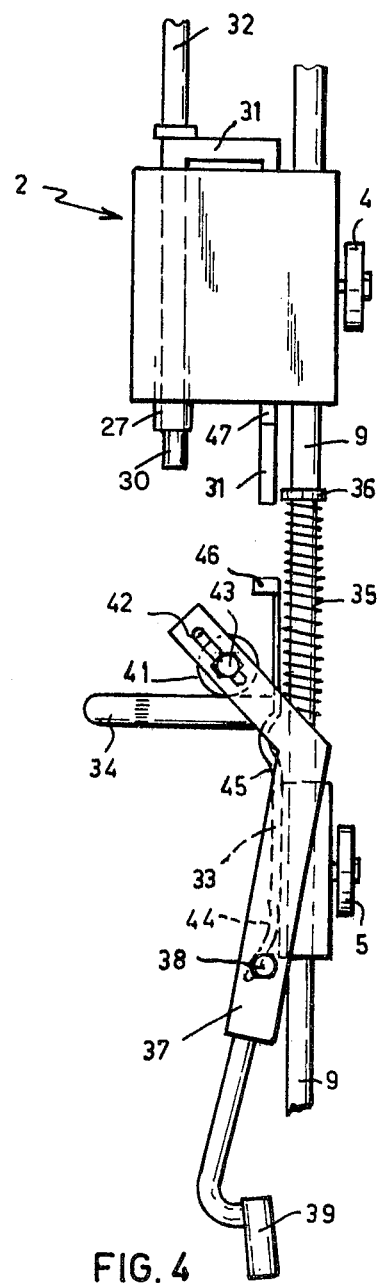
FIG. 3
FIG. 4

METHOD AND APPARATUS TO CUT OUT THE VENT OF A BIRD

This application is a continuation of application Ser. No. 160,623, filed June 18, 1980, now abandoned.

BACKGROUND AND SUMMARY

The present invention relates to an apparatus to cut out the vent of a bird which is suspended from a hook of a conveyor, having at least one rotatingly driven hollow cylindrical knife which is secured to a slide which is reciprocal along a guide in the direction of the bird. A vacuum can be generated in the knife, and the slide is provided with a follower which engages a curved cam of the apparatus. Means are provided to bring the bird's vent in the correct position opposite the knife.

Such apparatuses have been known in many configurations and in practice they are mostly part of a series of processing apparatuses for birds such as hens, chickens and the like being prepared for consumption which being disposed as much as possible along the same conveyor.

It is a general problem to form a vent cutting apparatus for birds with varying leg lengths and other dimensions related to growth, which will bring the birds to correct positions opposite the cylindrical knives, make a round incision to the correct depth around the vent of the bird without damaging the tail, and bring out of the bird the cut-out back and a connected part of the intestines.

It appeared almost impossible to achieve all this with an apparatus in which the slides and their followers follow a fixed curved path under all circumstances.

The present invention tends to improve an apparatus of the above described type so that the noticed problems are abolished. When doing so, one started from the fact that it is impossible to have the slides always follow a fixed curved path.

According to the invention, the followers of the slides, at the location where the vent is cut out, have a backlash of a few centimeters relative to the curved path of the cam, said backlash being removed by a stop of the slide which cooperates with means to bring the bird's vent in the correct position opposite the knife. The means for bringing the bird's vent to a correct position opposite the knife includes positioning means which can be moved up and down along the guides, said positioning means also having a follower which engages a curved cam surface.

As mentioned above, measures should also be taken to prevent the tail, which is not of the same size for all birds, from being damaged by the cylindrical knife. This is realized in the first place by providing the positioning means with a clip which keeps the bird's tail away from the rotating knife, said clip being brought in the correct position by a curved cam surface. The clip is preferably provided with slot holes, serving as a bearing for a roll with a tapered central portion which, when bringing the tail in the correct position, rolls along said tail.

Moreover, each of the cylindrical knives is arranged around a non-rotating vacuum pipe which, preliminary to the severing of operation, sucks the back somewhat upwardly.

The apparatus can also be provided with so-called clip hands which are biased by an elastic compressing member which is able to adapt itself to the differences in circumference of the birds. Said elastic compressing member consists of a belt or string, passed along three pulleys, one of which is biased by a spring. The bars on which the clip hands are placed are rotated by the belt or string such that, during the time the bird is processed with the rotating knife, it is forced against the positioning member.

Passing the rotatingly driven hollow cylindrical knives as close along the back as possible is a problem which requires special attention. If the knife is not adapted to pass closely along the back, then the egg glands of the birds may be damaged and this leads to inadmissible contamination. In many, but not in all, cases the correct position is achieved by so-called clip hands, also provided in the apparatus. If, however, the birds are not suspended from the legs, as is usual in Europe, but from the inwardly directed knees, as is usual in the USA, the clip hands are not sufficient because the force with which they press against the birds should not be increased too much. The invention also tends to improve this and, for some embodiments, even makes the clip hands superfluous.

According to the invention, this is achieved by having the chest clip extend in a downwardly inclined manner in an outward direction.

If the birds are suspended from the hooks of the conveyor with the knees directed outwardly, the downward extension of the chest clip, in side view, is at least partially in the configuration of a circle section.

If clip hands are present then the chest clip has straight portions which, in side view, extend downwardly and outwardly at an angle, said angle being preferably approximately 30°.

The invention will be further elucidated hereinafter on the basis of the drawing, in which by way of example an embodiment is shown of an apparatus according to the invention.

DESCRIPTION OF THE DRAWINGS

FIG. 3 shows in a larger scale a front view of a slide and a positioning member which are placed on two guide bars.

FIG. 4 shows a side view of FIG. 3.

DESCRIPTION OF THE PREFERRED EMBODIMENTS

Figure 1:
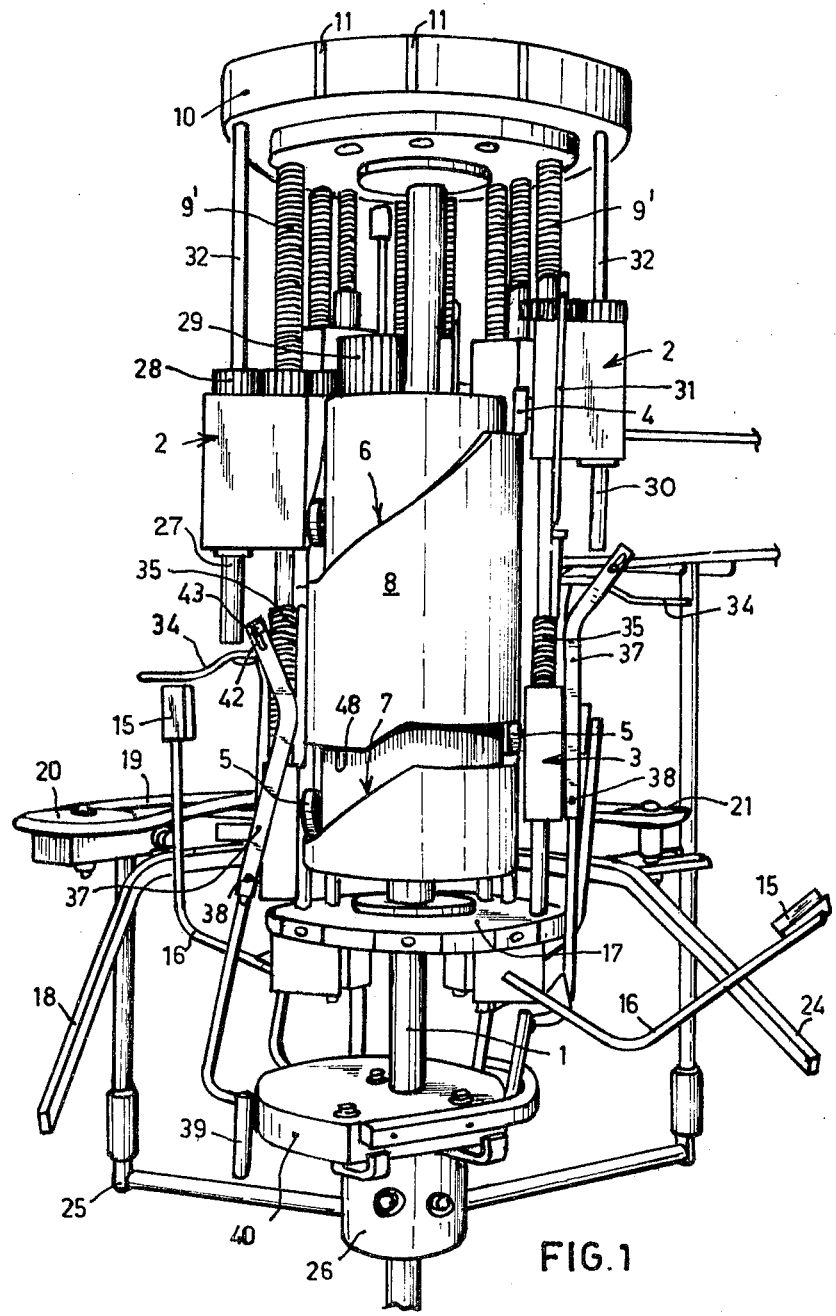
FIG. 1 shows a schematic side view in which, for clearness' sake three of the eight slides and pertaining machine components have been omitted. The birds, not shown, are suspended from hooks of a chain conveyor encircling the apparatus.
Figure 2:
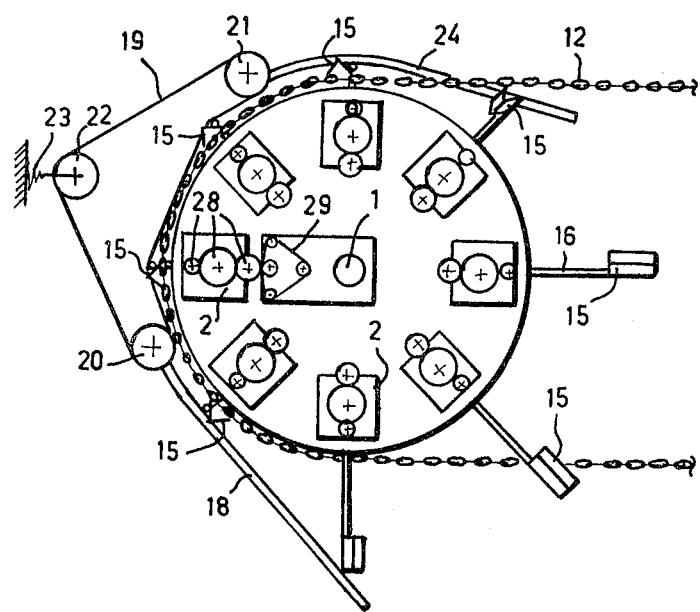
FIG. 2 shows a plan view of FIG. 1 without birds but with the bird-carrying chain conveyor encircling the apparatus.

The apparatus shown in the drawing is in the configuration of a roundabout. It is provided with a hollow central shaft 1, on which pairs of slides 2 and positioning members 3 are supported one above the other. The slides 3 and positioning members 4 are adapted to move upwardly and downwardly along parallel bars 9, under the influence of followers or rollers 4 and 5 which roll on the respective curved cam surfaces 6 and 7. In FIG. 1, these parallel bars are encircled by springs 9' which augment the downward load exerted by the influence of gravity. In FIG. 2, eight slides 2 are shown schematically, but the apparatus may of course in practice also have another number of pairs of slides and positioning members.

In FIG. 1, three of the eight slides have been omitted because it would otherwise have been impossible to depict the curved cam surfaces 6 and 7.

Figures 5, 6:
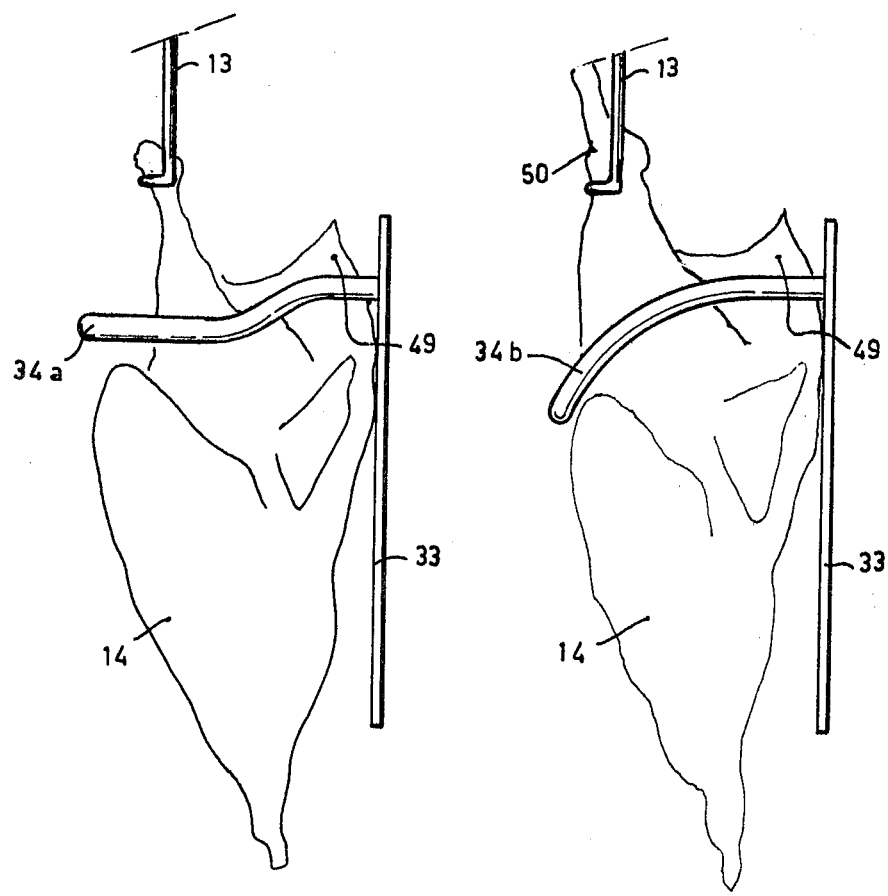
FIG. 5 shows, in a larger scale, a side view of a circle sector shaped chest clip and a modified compression plate.
FIG. 6 shows the same as FIG. 5, but with a buckled chest clip.

On the top end of the shaft 1, a drive wheel 10 is rotatably journalled. The peripheral edge of this wheel 10 is provided with recesses 11 which receive the hooks (not shown) which are suspended from a conveyor chain 12 (FIG. 2). All this is such that the hooks, slides 2 and positioning members 3 are adapted to be rotated about the shaft 2 synchronously and one above the other. The lower ends of the hooks (not shown) are, in a known manner, adapted to be connected to frame clips 13 having such a configuration that the ankle joints of a bird 14 can be retained thereby. The lower ends of these frame clips 13 are shown in FIGS. 5 and 6 which will later on be discussed to explain the differences between the European and American modes of suspension of the birds.

In addition to the above described followers or rollers 4 and 5 which roll along curved cam surfaces 6 and 7, the apparatus also comprises a plurality of clip hands 15 which force the bird's back against the positioning members 3 at the right moment and with the right force. Said clip hands 15 are rotatably connected via a bar 16 to a base wheel 17, mounted on the shaft 1. Assuming that the rotation in FIGS. 1 and 2 takes place in a clockwise direction, then the clip hands can be driven as follows: first, the bars 16 arrive against a stationary ramp 18, by which the bar forces the smallest birds against the positioning members with a relatively small force. The driving operation of the bars is taken over by a belt or string 19 which travels on three pulleys 20, 21 and 22. Pulley 22 is biased by a spring 23, so that birds of any size are forced against the positioning members with almost the same force. The pulleys 20, 21 and 22, spring 23, ramp 18 and a corresponding ramp 24 at the exit end of the roundabout are, as shown in FIG. 1, together supported by a structure 25 which is connected to a fixed and non-rotating bush 26 of the apparatus.

The characteristics of the slides 2 and positioning members 3 which are most relevant for the invention will be further elucidated hereinafter on the basis of FIGS. 3 and 4.

The slides 2 are provided with a follower, like a roll 4 (FIG. 4), which engages the curved cam surface 6 shown in FIG. 1. As will appear later on, the rolls and the curved cam surface need not cooperate with each other along the entire extent of the cam surface. The slide 2 is furthermore provided with a cylindrical knife 27 which, as is schematically indicated in FIGS. 1 and 2, can be driven rotatingly by a gear wheel system 28 which cooperates with a wide chain assembly 29, which is fixedly arranged in the apparatus. Said chain assembly 29 has a substantial height as shown in FIG. 1 so that the slide 2 with the rotating knife 27 may move downwardly during the time the vent is cut out. The cylindrical knife 27 is arranged about a non-rotating vacuum pipe 30, which is, however, movable upwardly and downwardly in the slide. The movement of the vacuum pipe 30 is controlled by a stop 31 which may cooperate with stop section 46 of compression plate 33 of the positioning member 3. The supply of subatmospheric pressure takes place via a tube 32.

The positioning member 3 comprises a vertical compression plate 33, being integrally formed with a chest clip 34 to be further elucidated, which arrives between the legs of the birds when the birds enter the apparatus, and when the positioning member 3 is lowered, arrives on the chest of the bird. At the rear side of the compression plate 33 the follower or roll 5 is mounted where it will engage the curved cam surface 7 of FIG. 1, having a free stroke of approximately five cm. so as to compensate the variations in bird length. Springs 35 are mounted on the bars 9 where they will act between the slide 3 and upper stops 36 which are mounted on the bars 9.

In order to keep the birds' tails away from the knives 27, each positioning member 3 is provided with a clip 37 which is adapted to pivot about a bolt 38 at the lower end of the vertical compression plate 33. Clip 37 pivots about bolt 38 when a lever pin 39 is deflected by a cam 40 (FIG. 1) which is situated above the non-rotating bush 26. The clip 37 is made suitable for birds of rather varying sizes by a roll 41 with a tapered central portion, which is supported by bolts 43 which extend through elongated holes 42 of the clip 37.

The compression plate 33 has two fold lines 44 and 45 and a stop section 46 at its top side which cooperates with the stop 31 of the vacuum pipe 30 and a stop 47 of the slide 2.

It may follow from the above that both the positioning members 3 and the slides 2 do not always follow the curved paths established by the respective cams 6 and 7. If the slides would do so, then problems will arise when processing with the vacuum pipe 30 and the rotating knife 27. The operation of the apparatus will become clear from the following succession of operations which the apparatus performs on a bird:

when the bird turns into the apparatus, assumed as the position of 0°, the clip hand 15 rises under the influence of the ramp 18 and presses the bird against the positioning member 3 with a relative low force, the cam 7 of the positioning member 3 gradually declines at a stroke length of approximately 9 cm., and the upper run 48 (FIG. 1) of the cam permits a free stroke of approximately 5 cm., the bar 16 of the clip hand 15 is contacted by the belt or string 19, pressing the bird against the positioning member with a force which is almost independent of the size of the bird, the tail of the bird is forced rearwardly (to the right in FIG. 4) by the roll 41 and in this operation also the upper fold line 45 of the compression plate 33 plays a part, the vacuum pipe 30 and the cylindrical knife 27 gradually extend downwardly together with the slide 2 at a stroke of approximately 15 cm. from the position 120°, while the upper run of the cam still takes care of a free stroke, after the vacuum pipe 30 arrives at the back of the bird, the knife 27 further descends rotatingly at a distance of approximately 3½ cm., said stroke being defined by the difference in distance between the stops 31 and 47, the cylindrical knife 27 and the vacuum pipe 30 rise together and finally at position 220° the vacuum pipe is substantially at the same level as the lower side of the knife, so that the back and a part of the intestine hang out of the bird, the clip hand 15 can now return to the retracted position, which is allowed by the exit ramp 24.

In said operations, it is essential that the vacuum pipe 30 does not rotate relative to the bird, to ensure that the intestine will not be damaged and the interior of the bird is not contaminated by fecal contaminations. The subatmospheric pressure in the vacuum pipe is admitted between the positions of approximately 120° and approximately 220°, but in any case just beyond the position of 180°.

It is also essential in said operations that the rotating knife 27, which is preferably ground obliquely, severs as close along the back of the bird as possible to avoid contact with the egg gland. It appears that this can be prevented by the chest clips 34a and 34b, shown in FIGS. 5 and 6, which, owing to the outwardly downwardly curved configuration, urge the pelvis 49 of the bird 8 in the direction of the compression plate 33. When the positioning means are lowered the horizontal components of the forces exerted on the birds by the chest clips press the birds against the compression plates.

In FIG. 5, a bird is shown which is suspended outwardly from the ankle joints in the European manner, where the chest clip 34a has a straightly extending section, extending downwardly and outwardly less than approximately 30°. In said variation of the embodiment, also the clip hand 15 of FIG. 1 may be stationary.

In FIG. 6, a bird is shown suspended inwardly from the knees 50, in the American way of suspending, in which a chest clip 34b which has a circle sector like side view can be used, giving the same favorable result.

What is claimed is:

1. A method of removing the vent opening from a bird comprising supporting the bird by its legs in an inverted attitude, moving the bird against an upright compression plate with the tail of the bird moving beneath a chest clip and the chest clip protruding between legs of the bird, moving the chest clip downwardly until the chest clip straddles the tail portion of the bird, urging the back of the bird against the compression plate, urging the tail of the bird toward the compression plate, moving a vacuum pipe with an open lower end downwardly until its opening engages the bird about its vent opening, moving the lower cylindrical cutting edge of a cylindrical knife downwardly in telescoping relationship with respect to the vacuum pipe to a level lower than the lower end of said vacuum pipe and rotating the cylindrical knife to cut out the vent opening of the bird, and inducing a pressure lower than atmospheric pressure in the vacuum pipe to exert a pulling force on the vent opening of the bird.

2. The method of claim 1 and wherein the step of moving the vacuum pipe downwardly comprises moving the vacuum pipe downwardly until its opening stops at a predetermined distance above the chest clip, and wherein the step of moving the cylindrical knife downwardly comprises moving the cylindrical knife downwardly until its lower cylindrical cutting edge stops at a predetermined position with respect to the chest clip.

3. Apparatus to cut out the vent of a bird suspended by its legs in an inverted attitude on an overhead conveyor comprising positioning means movable laterally in timed relationship with a bird on the conveyor and movable vertically with respect to the bird, said positioning means including a chest clip for insertion between the legs of a bird, cam means for lifting said positioning means and for permitting said positioning means to move downwardly until the chest clip straddles the tail portion of the bird to support said positioning means on the bird, slide means positioned above said positioning means and movable vertically toward and away from said positioning means and supporting a vacuum pipe having a lower open end, means for guiding said slide means downwardly until the lower open end of said vacuum pipe engages the bird about its vent opening, and a cylindrical cutter movable in telescoping relationship and axially with respect to said vacuum pipe downwardly into engagement with the bird about its vent opening, said cylindrical cutter having a lower cutting edge which is downwardly movable to a level which is lower than the lower end of the vacuum pipe, and means for rotating said cylindrical cutter.

4. The apparatus of claim 3 and further including a roll member movable along said chest clip to engage the tail portion of the bird when the chest clip straddles the tail portion of the bird.

5. Apparatus for cutting out the vent of a slaughtered bird, comprising,
  a slide which is reciprocal along a guide in the direction of a bird, said slide having a first cam follower thereon,
  a first cam which has a surface engageable by said first cam follower,
  at least one rotatingly driven knife mounted on the slide,
  means for generating a vacuum in the knife, positioning means for bringing a bird's vent to a position opposite the knife, said positioning means including a positioning member which is reciprocal along the guide, stop means operable between the slide and the positioning means for limiting the extent of movement of the slide relative to the positioning means,
  said apparatus having a backlash between the first cam and the first follower which permits the first cam follower to depart from the surface of the first cam after operation of the stop means,
  a second cam follower connected to the positioning member, a second cam which has a surface engageable by the second cam follower, said apparatus having a backlash between the second cam and the second cam follower which permits the second cam follower to depart from the surface of the second cam.

6. Apparatus according to claim 5 having two guides and having two springs located about said guides.

7. Apparatus according to claim 5 wherein the positioning member is provided with a clip for keeping a bird's tail away from the knife, and a curved cam for moving said clip to a position where it keeps a bird's tail away from the knife.

8. Apparatus according to claim 7 wherein the clip has two slots, a roll rotatably supported by said slots and having a tapered central portion for rolling along a bird's tail when bringing the tail to a position away from the knife.

9. Apparatus according to claim 5 having a non-rotating vacuum pipe located within said rotating knife.

10. Apparatus according to claim 9 wherein the vacuum pipe is axially movable relative to the slide and is connected to a stop member which engages the positioning member to limit the extent of movement of the vacuum pipe toward the positioning member.

11. Apparatus according to claim 5 wherein said positioning means has a chest clip for engaging the chest of a bird, said chest clip being inclined downwardly and outwardly.

12. Apparatus according to claim 11 wherein the chest clip, in side view, has a portion which is at least partially in the configuration of a circle sector.

13. Apparatus according to claim 11 wherein the chest clip, in side view, has straight portions which extend downwardly and outwardly at an angle.

14. Apparatus according to claim 13 wherein the angle between said straight portions is approximately 30°.

15. Apparatus for cutting out the vent of a slaughtered bird, comprising, a slide which is reciprocal along the guide in the direction of a bird, said slide having a first cam follower thereon, a first cam which has a surface engageable by said first cam follower, at least one rotatingly driven knife mounted on the slide, means for generating a vacuum in the knife, positioning means for bringing a bird's vent to a position opposite the knife, stop means operable between the slide and the positioning means for limiting the extent of movement of the slide relative to the positioning means, said apparatus having a backlash between the first cam and the first cam follower which permits the first cam follower to depart from the surface of the first cam after operation of the stop means, a non-rotating vacuum pipe located within said rotating knife, said vacuum pipe being axially movable relative to the slide and being connected to a stop member which engages the positioning means to limit the extent of movement of the vacuum pipe toward the positioning means.

16. Apparatus according to claim 15 wherein the positioning means include a positioning member which is reciprocal along the guide.

a second cam follower connected to the positioning member, a second cam which has a surface engageable by the second cam follower, said apparatus having a backlash between the second cam and the second cam follower which permits the second cam follower to depart from the surface of the second cam.

17. Apparatus according to claim 16 having two said guides and having two springs located about said guides.

18. Apparatus according to claim 16 wherein the positioning member is provided with a clip for keeping a bird's tail away from the knife, and a curved cam for moving said clip to a position where it keeps a bird's tail away from the knife.

19. Apparatus according to claim 18 wherein the clip has two slots, a roll rotatably supported by said slots and having a tapered central portion for rolling along a bird's tail when bringing the tail to a position away from the knife.

20. Apparatus according to claim 15 wherein said positioning means has a chest clip for engaging the chest of a bird, said chest clip being inclined downwardly and outwardly.

* * * * *